July 16, 1929.　　　S. S. WOLFE　　　1,720,986
COOKING VESSEL
Filed July 23, 1928

S. S. Wolfe, Inventor
By C. A. Snow & Co.
Attorneys

Patented July 16, 1929.

1,720,986

UNITED STATES PATENT OFFICE.

SAMUEL S. WOLFE, OF CARLTON, TEXAS.

COOKING VESSEL.

Application filed July 23, 1928. Serial No. 294,651.

This invention relates to cooking vessels, and aims to provide a cooking vessel which will be automatically elevated from the stove, when the water in the vessel becomes exhausted, or reaches a dangerously low level.

An important object of the invention is to provide a device of this character which may be adjusted to cause the elevating of the vessel to take place at a predetermined time.

A still further object of the invention is the provision of a signal to be operated automatically and simultaneously with the elevating of the vessel.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Referring to the drawing.

Figure 1:
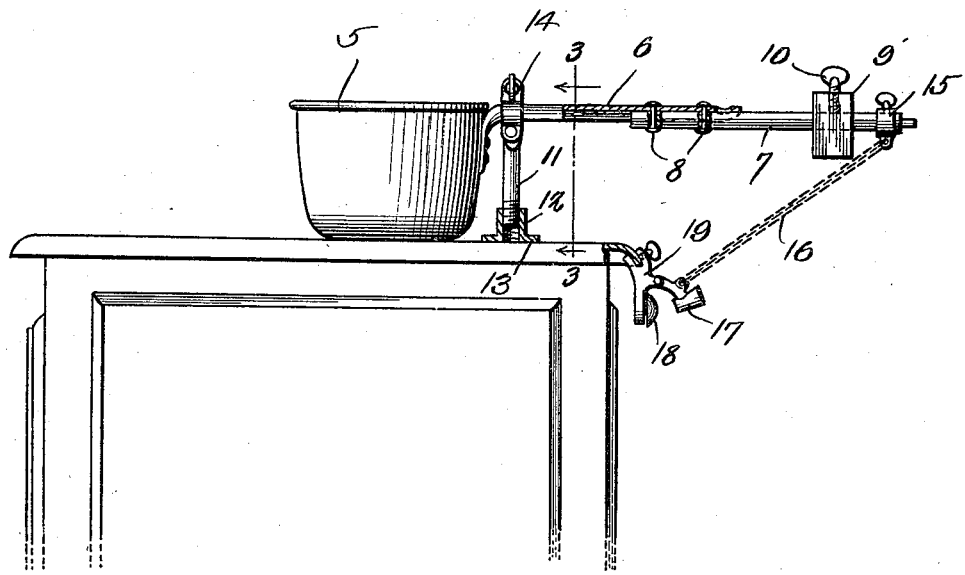
Figure 1 is a side elevational view illustrating a cooking vessel constructed in accordance with the invention.
Figure 2:
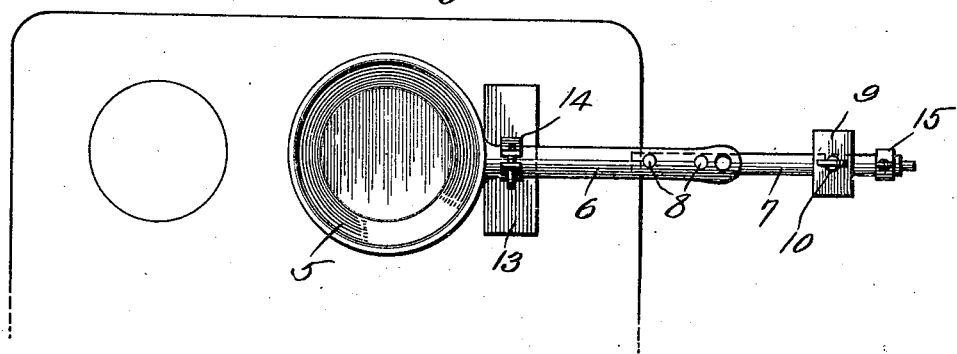
Figure 2 is a plan view thereof.
Figure 3:
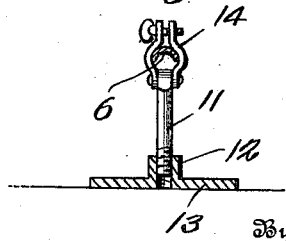
Figure 3 is a sectional view taken on line 3—3 of Figure 1.

Referring to the drawing in detail, the cooking vessel is designated by the reference character 5, the same being of the type used in boiling articles such as potatoes, beets, turnips or the like, and as shown is provided with a handle 6.

The reference character 7 designates an extension handle which is riveted to the handle 6, by means of the rivets 8. The extension handle 7 is preferably round in cross section and supports the weight 9 that is adjustable longitudinally of the extension handle 7, the same being held in its positions of adjustment, by means of the set screw 10.

The support for the receptacle embodies a standard 11 that has a threaded extension 12 fitted in a threaded socket of the foot 13 which insures the support 11 being held in an upright position at all times. Pivotally mounted at the upper end of the support 11 is a clamp 14 which is of a construction to be clamped around the handle 6 to secure the vessel to the support.

Thus it will be seen that when the vessel is to be used for cooking, the vegetables to be cooked and the water in which the vegetables are to be cooked are placed in the vessel and the weight 9 is moved to a position so that the weight will overbalance the weight of the vessel and its contents, when the water has boiled away, to the end that the vessel will be elevated from the stove insuring against any possibility of the vegetables scorching or burning.

A collar indicated at 15 is mounted on the extension handle 7, to which collar the chain 16 is connected, the opposite end of the chain being connected with the tapper 17 adapted to engage the bell 18. This tapper and bell are supported on the bracket 19 that in turn is clamped to the stove top as clearly shown by the drawing.

It will therefore be obvious that as the handle is tilted in elevating the receptacle a signal will be sounded informing the attendant that the vegetables should be removed.

I claim:

1. In a device of the character described, a support, a pivoted clamping member at the upper end of the support and adapted to clamp to the handle of a cooking vessel, a weight on the handle to counterbalance the weight of articles in the vessel, and said weight adapted to elevate the vessel when the weight of the material within the vessel decreases below the weight mounted on the handle.

2. In a device of the character described, a support to be positioned on a stove, a clamp pivotally mounted at the upper end of the support and adapted to clamp the handle of a cooking vessel positioned on the stove, an adjustable weight mounted on the handle, the weight of the material in the vessel adapted to normally overbalance the weight on the handle, the weight on the handle adapted to overbalance the weight of the vessel and its contents when the contents of the vessel boil away, and a signal operated by the downward movement of the handle.

3. In a device of the character described, a support having a base to rest on a stove, a pivoted clamping member mounted at the upper end of the support and adapted to clamp around the handle of a cooking vessel positioned on the stove, an extension handle connected with the handle of the vessel, an adjustable weight on the extension handle, said weight adapted to overbalance the cooking vessel to elevate the cooking vessel, means for holding the weight in its positions of adjustment, and a signaling device operated by the downward movement of the weight.

In testimony that I claim the foregoing as my own, I have hereto affixed by signature.

SAMUEL S. WOLFE.